US010282771B2

(12) United States Patent
Welch et al.

(10) Patent No.: US 10,282,771 B2
(45) Date of Patent: May 7, 2019

(54) SYSTEMS AND METHODS FOR PROGRAMATICALLY CLASSIFYING TEXT USING TOPIC CLASSIFICATION

(71) Applicant: Nook Digital, LLC, New York, NY (US)

(72) Inventors: Michael Jason Welch, Mountain View, CA (US); Aditya Vailaya, San Jose, CA (US); Ralph Rizkallah Rabbat, San Carlos, CA (US); Jiang Wu, Union City, CA (US)

(73) Assignee: Nook Digital, LLC, New York, NY (US)

( * ) Notice: Subject to any disclaimer, the term of this patent is extended or adjusted under 35 U.S.C. 154(b) by 68 days.

(21) Appl. No.: 15/613,880

(22) Filed: Jun. 5, 2017

(65) Prior Publication Data

US 2017/0308950 A1  Oct. 26, 2017

Related U.S. Application Data

(63) Continuation of application No. 13/968,341, filed on Aug. 15, 2013, now Pat. No. 9,672,556.

(51) Int. Cl.
*G06F 16/35* (2019.01)
*G06Q 30/06* (2012.01)

(52) U.S. Cl.
CPC ......... *G06Q 30/0631* (2013.01); *G06F 16/35* (2019.01); *G06F 16/353* (2019.01)

(58) Field of Classification Search
CPC ......... G06F 17/30705; G06F 17/30401; G06F 17/30616; G06F 17/30554; G06F 16/16; G06F 16/35; G06F 16/243; G06F 16/313; G06F 16/248

USPC ................................................ 707/727, 731
See application file for complete search history.

(56) References Cited

U.S. PATENT DOCUMENTS

| 5,369,577 A * | 11/1994 | Kadashevich ........ G06F 17/274 704/9 |
| 8,589,399 B1 | 11/2013 | Lee |
| 2003/0182631 A1 * | 9/2003 | Tsochantaridis ...... G06F 16/313 715/255 |

(Continued)

OTHER PUBLICATIONS

Office Action for U.S. Appl. No. 13/968,332, 16 pages.

*Primary Examiner* — James Trujillo
*Assistant Examiner* — Fariborz Khoshnoodi
(74) *Attorney, Agent, or Firm* — Finch & Maloney PLLC

(57) ABSTRACT

Systems and methods for programmatically classifying text are discussed herein. Some embodiments may provide for a system including circuitry configured to programmatically classify a block of text. For example, the circuitry may be configured to identify topics associated with the block of text and identify one or more categories for each of the topics. The circuitry may be further configured to determine unique categories across the one or more categories for each of the topics. For each unique category, an actual category frequency may be determined based on a number of times each of the topics in the block of text is associated with the unique category. The circuitry may be further configured to associate a unique category with the block of text based on the actual category frequency for each the unique category and one or more other actual category frequencies for one or more other unique categories.

20 Claims, 11 Drawing Sheets

(56) References Cited

U.S. PATENT DOCUMENTS

| | | | |
|---|---|---|---|
| 2005/0240943 A1 | 10/2005 | Smith | |
| 2010/0161671 A1* | 6/2010 | Charnine | G06F 16/355 707/797 |
| 2011/0313852 A1* | 12/2011 | Kon | G06Q 30/0247 705/14.46 |
| 2014/0365515 A1* | 12/2014 | Garrett | G06F 16/332 707/759 |
| 2015/0052127 A1 | 2/2015 | Welch | |
| 2015/0066940 A1* | 3/2015 | Fernandes | G06Q 10/10 707/740 |

\* cited by examiner

300

| |
|---|
| Topic Listing |
| ⋮ |
| Computer Games |
| C++ |
| Visual Basic |
| Java |
| Santa Clara |
| ⋮ |

| Topic-to-Category Maping | |
|---|---|
| Topic | Categories |
| ⋮ | ⋮ |
| Computer Games | Software |
| C++ | Programming Language |
| Visual Basic | Programming Language |
| Santa Clara | City, Saint |
| Java | Programming Language, Island |
| ⋮ | ⋮ |

FIG. 4

SYSTEMS AND METHODS FOR PROGRAMATICALLY CLASSIFYING TEXT USING TOPIC CLASSIFICATION

RELATED APPLICATIONS

This application is a continuation of U.S. patent application Ser. No. 13/968,341, filed on Aug. 15, 2013, which is incorporated by reference herein in its entirety.

FIELD

Embodiments of the invention relate, generally, to programmatically classifying text.

BACKGROUND

Online merchants often use co-purchased items to recommend other items to users. For example, the merchant may track sales data indicating that a first item and a second item are often co-purchased by users. Based on the historical sales data, a user that purchases the first item is then recommended the second item. However, recently released items or rarely purchased items commonly do not have sufficient sales statistics to be easily discovered and recommended to users as a co-purchased item. In this regard, areas for improving current systems have been identified.

BRIEF SUMMARY

Through applied effort, ingenuity, and innovation, solutions to improve such systems have been realized and are described herein. In general, techniques are provided to programmatically classify text. For example, some embodiments may provide for a method of programmatically classifying text including: receiving, from a non-transitory computer readable media, a block of text; identifying topics associated with the block of text; identifying one or more categories for each of the topics; determining unique categories across the one or more categories for each of the topics; determining, by a processor, an actual category frequency for a unique category based on a number of times each of the topics in the block of text is associated with the unique category; and associating the unique category with the block of text based on the actual category frequency for the unique category and one or more other actual category frequencies for one or more other unique categories to provide a machine-generated summary of the block of text's content's meaning.

In some embodiments, identifying the topics may include identifying a first topic by comparing a portion of the block of text with a topic list of topics and determining the portion of the block of text matches at least the first topic.

In some embodiments, the method may further include: identifying an expected category frequency for the unique category; determining a surprise score for the unique category derived from an algorithmic relationship of the actual category frequency and the expected category frequency; and associating the unique category with the block of text based on the surprise score for the unique category. In some embodiments, determining the expected category frequency for the unique category may include determining the expected frequency for the unique category based on a length of the block of text and a number of topics associated with the unique category as defined by classification data.

For example, the classification data may indicate associations between topics and categories of a text classification system.

In some embodiments, the method may further include: determining classification data indicating an expected category frequency for each unique category of a text classification system; and determining the expected frequency for the unique category based on the classification data.

In some embodiments, the method may further include: determining a topic frequency for each of the topics based on a number of times each topic is identified in the block of text; and associating the unique category with the block of text based on the topic frequency for each of the topics.

In some embodiments, the method may further include: associating the unique category with a parent category of the unique category; determining an actual parent category frequency for the parent category of the unique category; determining a category score for the unique category derived from an algorithmic relationship of the actual parent category frequency and the actual category frequency; and associating the unique category with the block of text based on the category score for the unique category and one or more other category scores for the one or more other unique categories.

In some embodiments, the method may further include: associating each unique category with M levels of parent categories of each unique category and N levels of child categories of each unique category; determining category graph data for the block of text including each unique category, the M levels of parent categories for each unique category, and the N levels of child categories for each unique category; determining a connected category score for the unique category based on an algorithmic relationship of an actual category frequency for the unique category, an actual parent category frequency for each parent category of the M levels of parent categories, and an actual child category frequency for each child category of the N levels of child categories for the unique category; and associating the unique category with the block of text based on the connected category score for the unique category and one or more other connected category scores for the one or more other unique categories.

In some embodiments, the block of text may be a portion of a text comprising a second block of text. The method may further include: receiving, from the non-transitory computer readable media, the second block of text; and associating the unique category with the text based on a first category frequency of the unique category in the block of text and a second category frequency for the unique category in the second block of text. In some embodiments, the method may further include: receiving, from the non-transitory computer readable media, the second block of text; associating a second unique category with the second block of text based on a second actual category frequency for the second unique category; and associating the unique category and the second unique category with the text.

Some embodiments may provide for a system configured to programmatically classify text. The system may include circuitry configured to: receive, from a non-transitory computer readable media, a block of text; identify topics associated with the block of text; identify one or more categories for each of the topics; determine unique categories across the one or more categories for each of the topics; determine an actual category frequency for a unique category based on a number of times each of the topics in the block of text is associated with the unique category; and associate the unique category with the block of text based on the actual category frequency for the unique category and one or more other actual category frequencies for one or more other unique categories.

In some embodiments, the circuitry configured to identify the topic may include the circuitry being configured to identify a first topic by comparing a portion of the block of text with a topic list of topics and determining the portion of the block of text matches at least the first topic.

In some embodiments, the circuitry may be further configured to: identify an expected category frequency for the unique category; determine a surprise score for the unique category derived from an algorithmic relationship of the actual category frequency and the expected category frequency; and associate the unique category with the block of text based on the surprise score for the unique category.

In some embodiments, the circuitry configured to determine the expected category frequency for the unique category may include the circuitry being configured to determine the expected frequency for the unique category based on a length of the block of text and a number of topics associated with the unique category as defined by classification data, the classification data indicating associations between topics and categories of a text classification system.

In some embodiments, the circuitry may be further configured to: determine classification data indicating the expected category frequency for each unique category of a text classification system; and determine the expected frequency for the unique category based on the classification data.

In some embodiments, the circuitry may be further configured to: determine a topic frequency for each of the topics based on a number of times each topic is identified in the block of text; and associate the unique category with the block of text based on the topic frequency for each of the topics.

In some embodiments, the circuitry may be further configured to: associate the unique category with a parent category of the unique category; determine an actual parent category frequency for the parent category of the unique category; determine a category score for the unique category derived from an algorithmic relationship of the actual parent category frequency and the actual category frequency; and associate the unique category with the block of text based on the category score for the unique category and one or more other category scores for the one or more other unique categories.

In some embodiments, the circuitry may be further configured to: associate each unique category with M levels of parent categories of each unique category and N levels of child categories of each unique category; determine category graph data for the block of text including each unique category, the M levels of parent categories for each unique category, and the N levels of child categories for each unique category; determine a connected category score for the unique category based on an algorithmic relationship of an actual category frequency for the unique category, an actual parent category frequency for each parent category of the M levels of parent categories, and an actual child category frequency for each child category of the N levels of child categories for the unique category; and associate the unique category with the block of text based on the connected category score for the unique category and one or more other connected category scores for the one or more other unique categories.

In some embodiments, the block of text is a portion of a text comprising a second block of text. The circuitry may be further configured to: receive, from the non-transitory computer readable media, the second block of text; and associate the unique category with the text based on a first category frequency of the unique category in the block of text and a second category frequency for the unique category in the second block of text. In some embodiments, the circuitry may be further configured to: receive, from the non-transitory computer readable media, the second block of text; associate a second unique category with the second block of text based on a second actual category frequency for the second unique category; and associate the unique category and the second unique category with the text.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
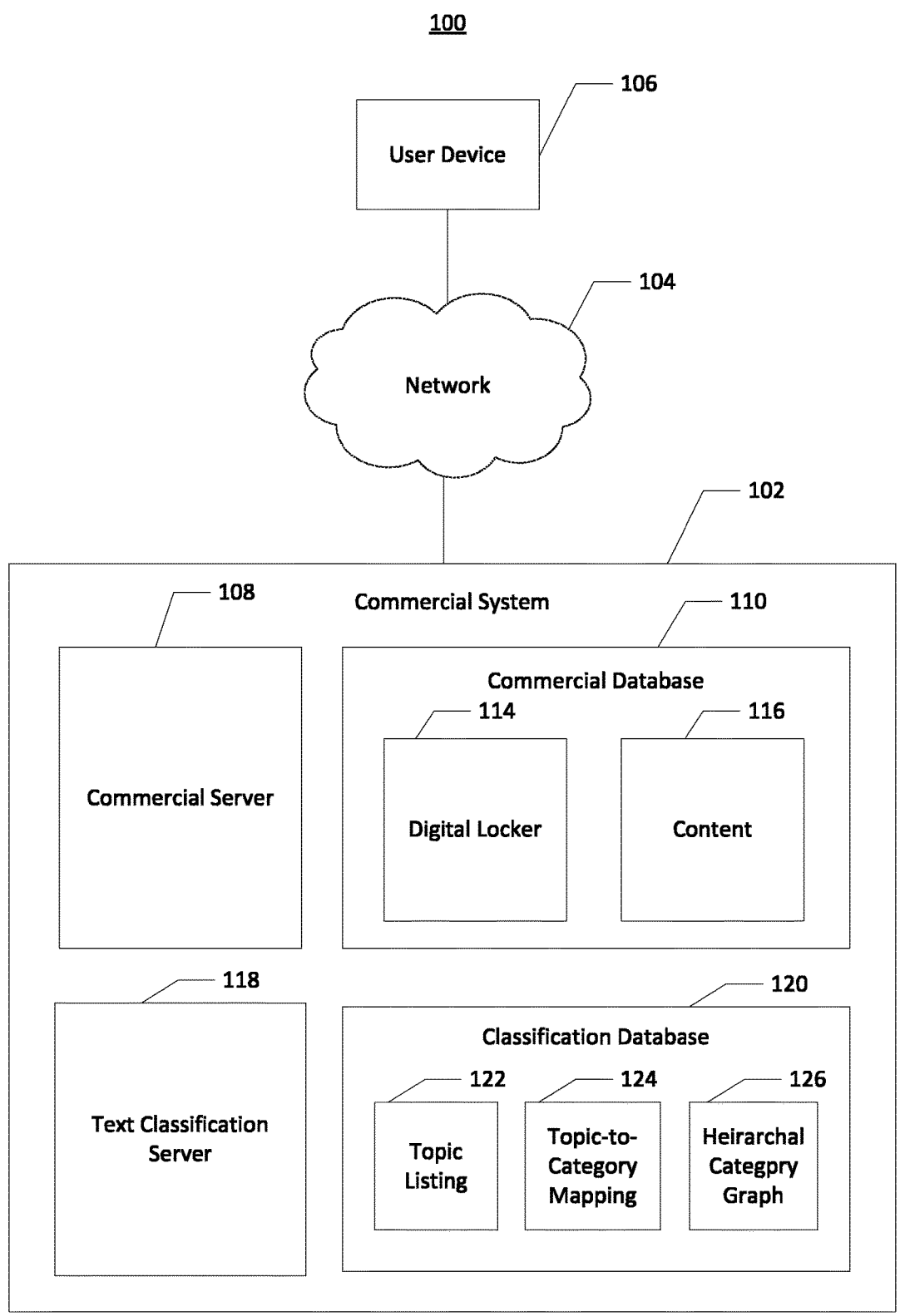
Figure 2:
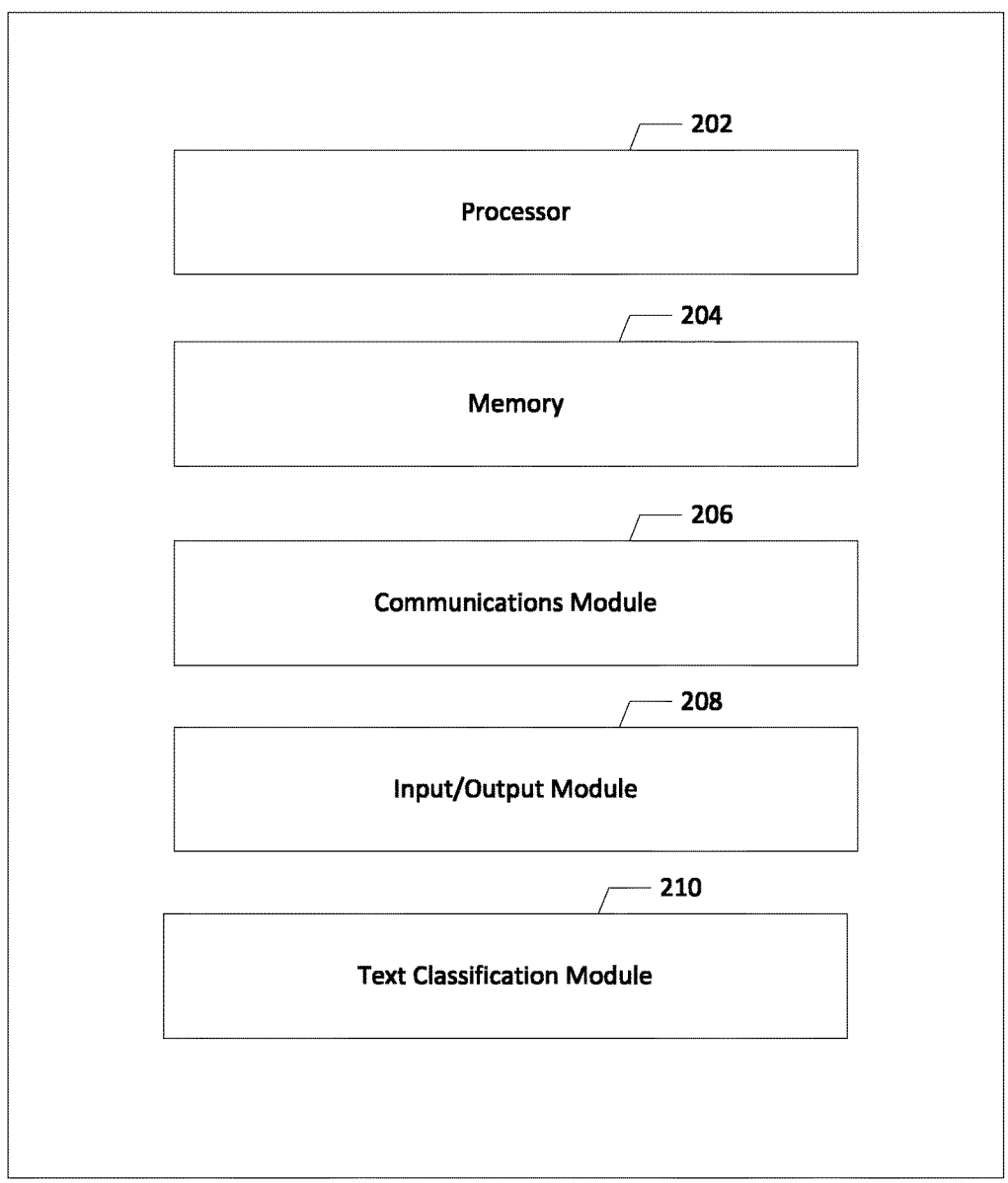
Figure 5:
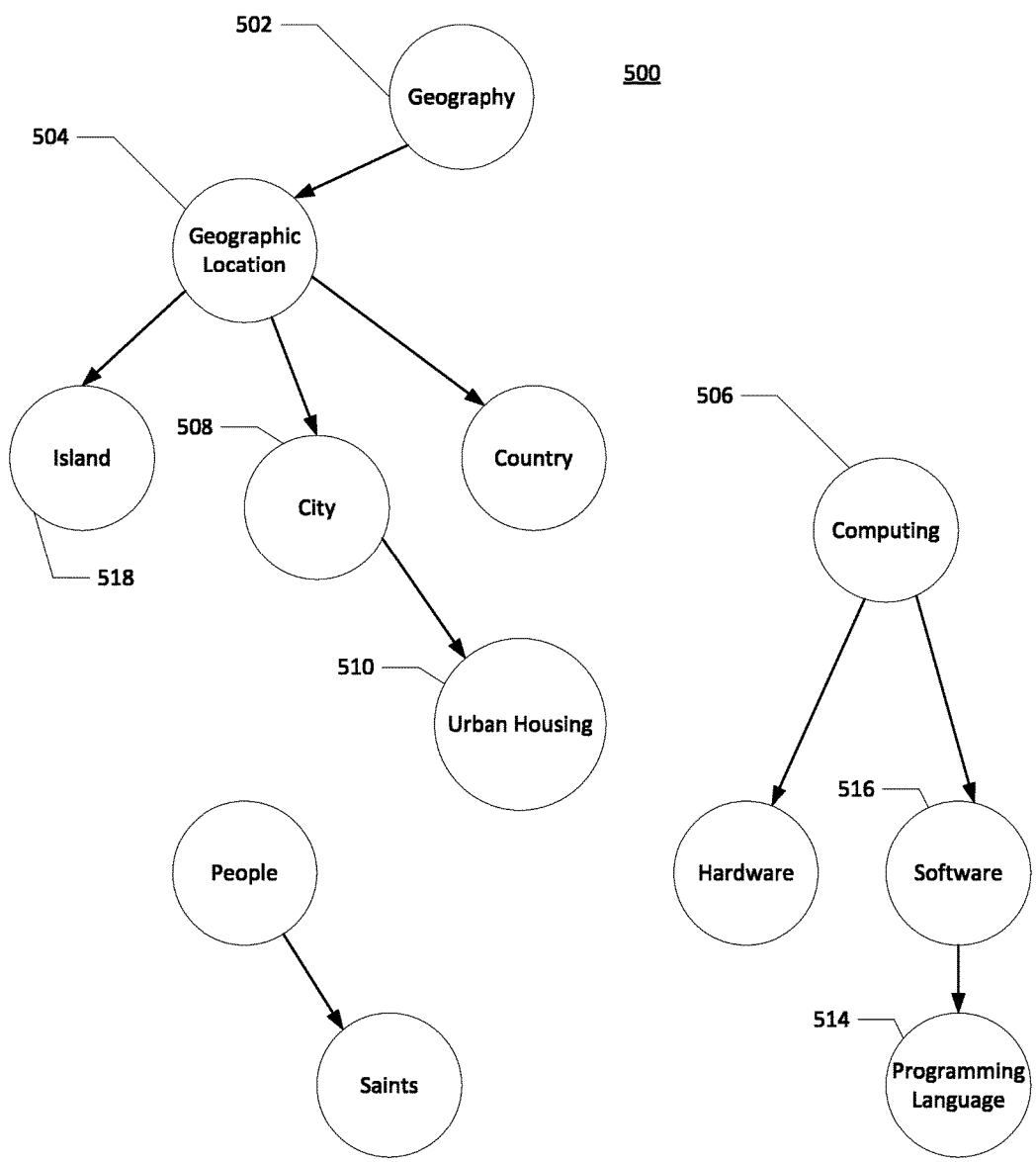
Figure 6:
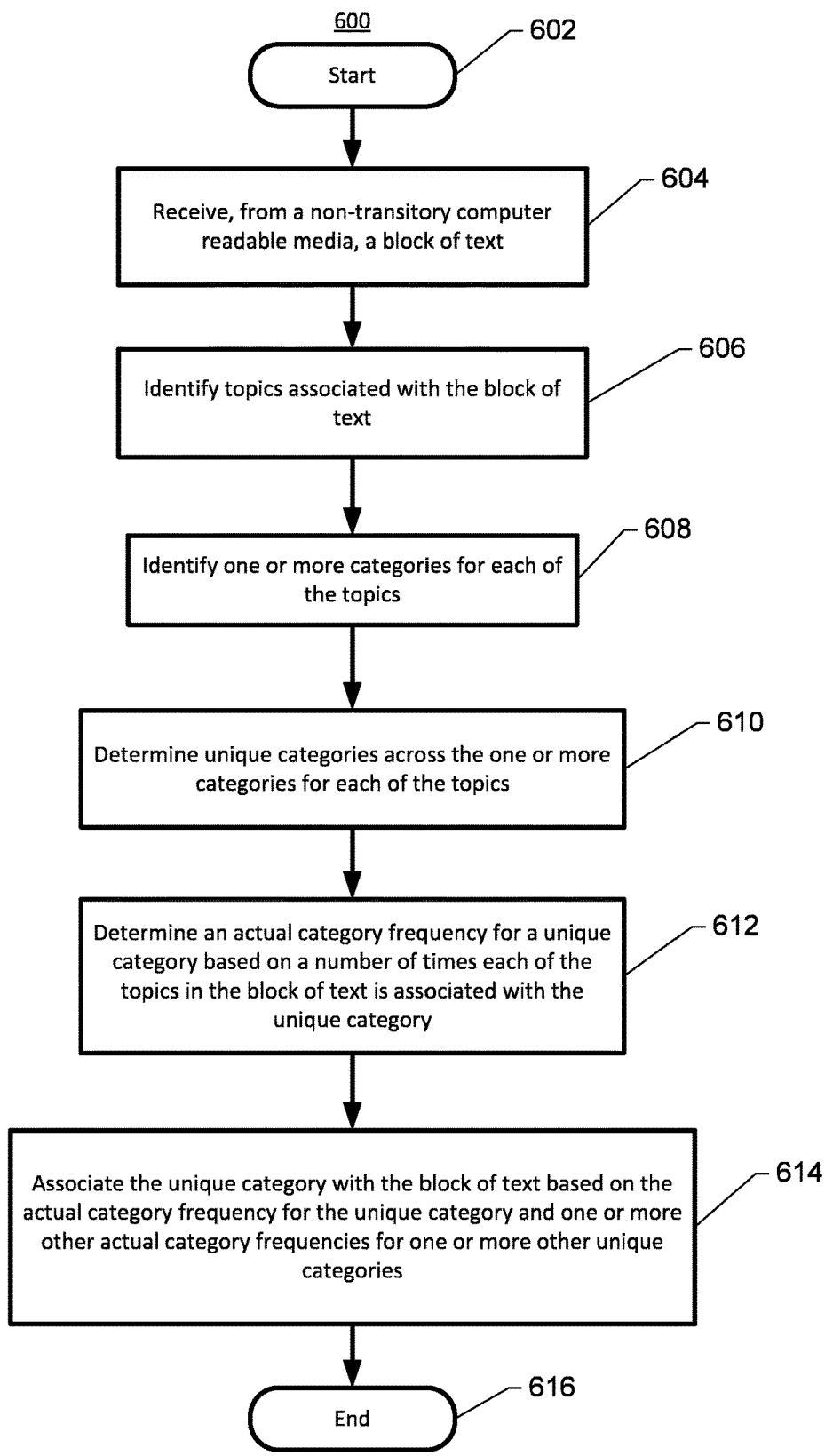
Figure 7:
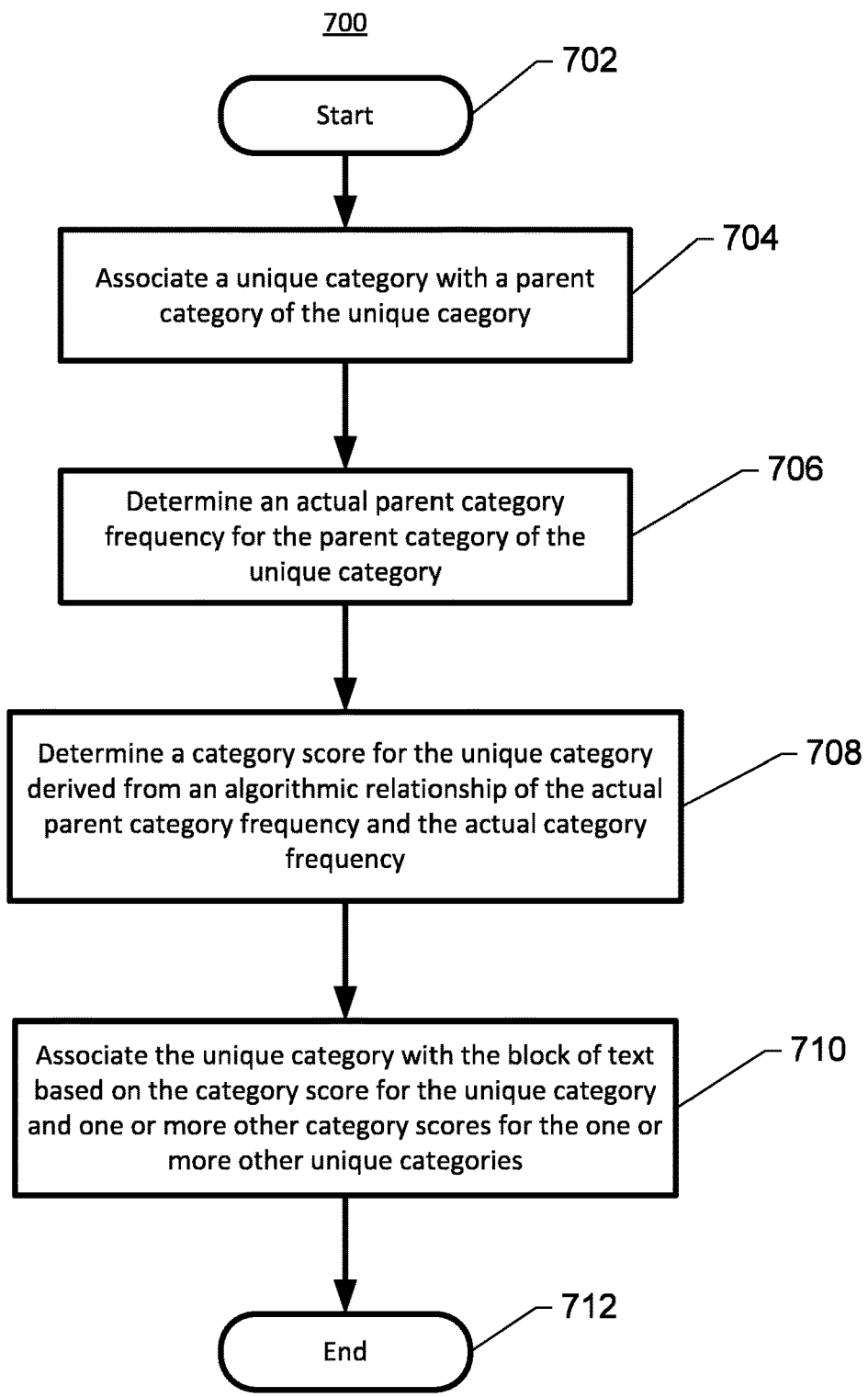
Figure 8:
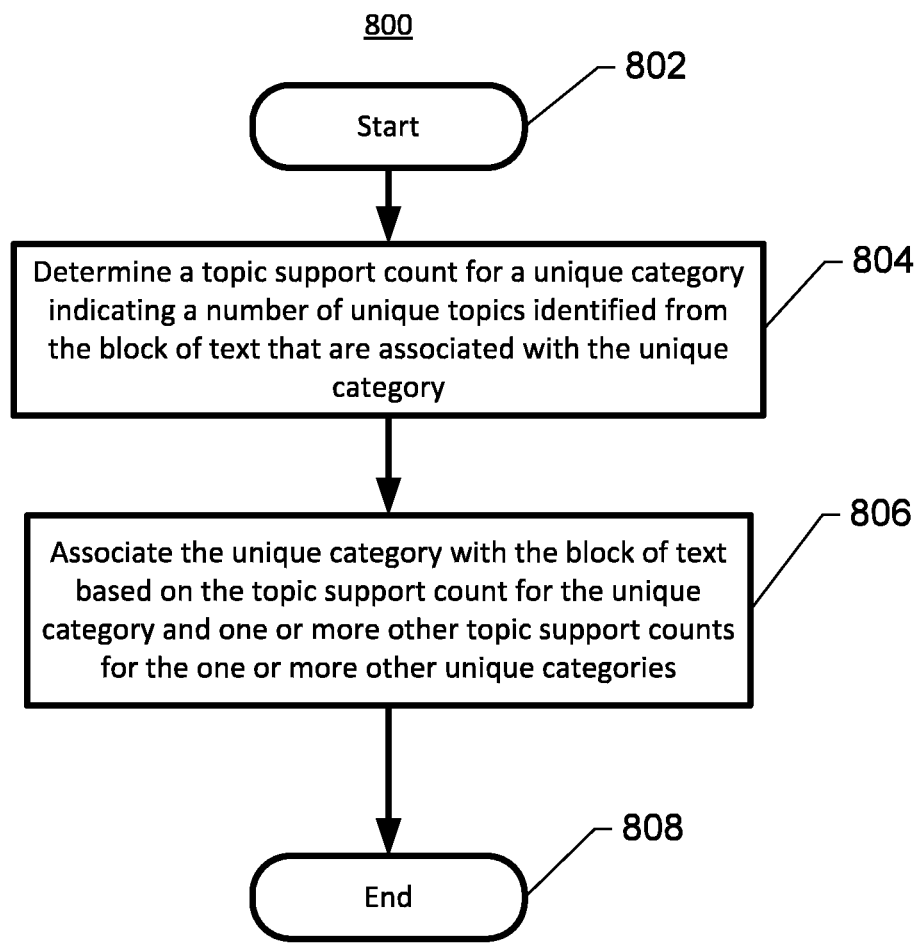
Figure 9:
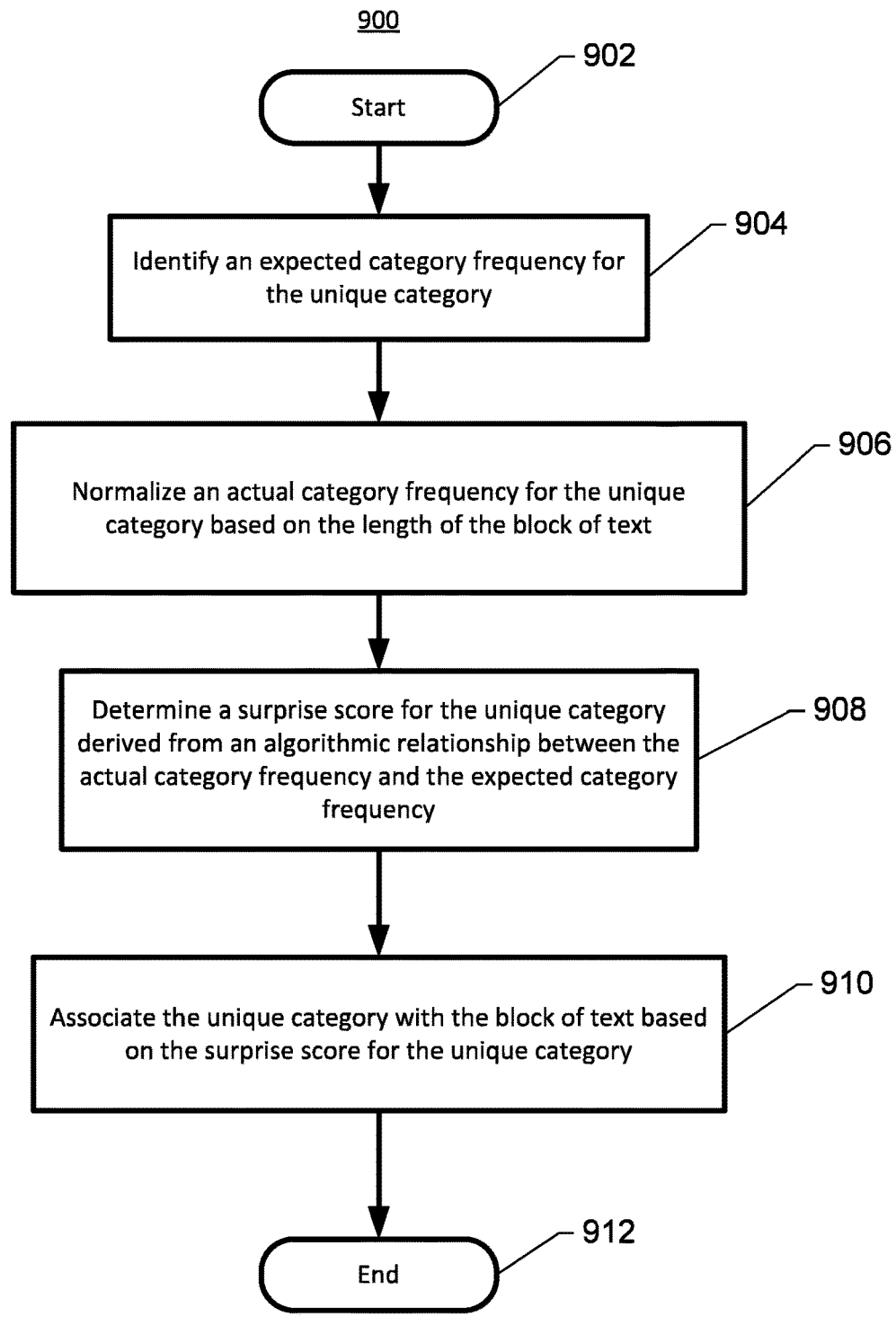
Figure 10:
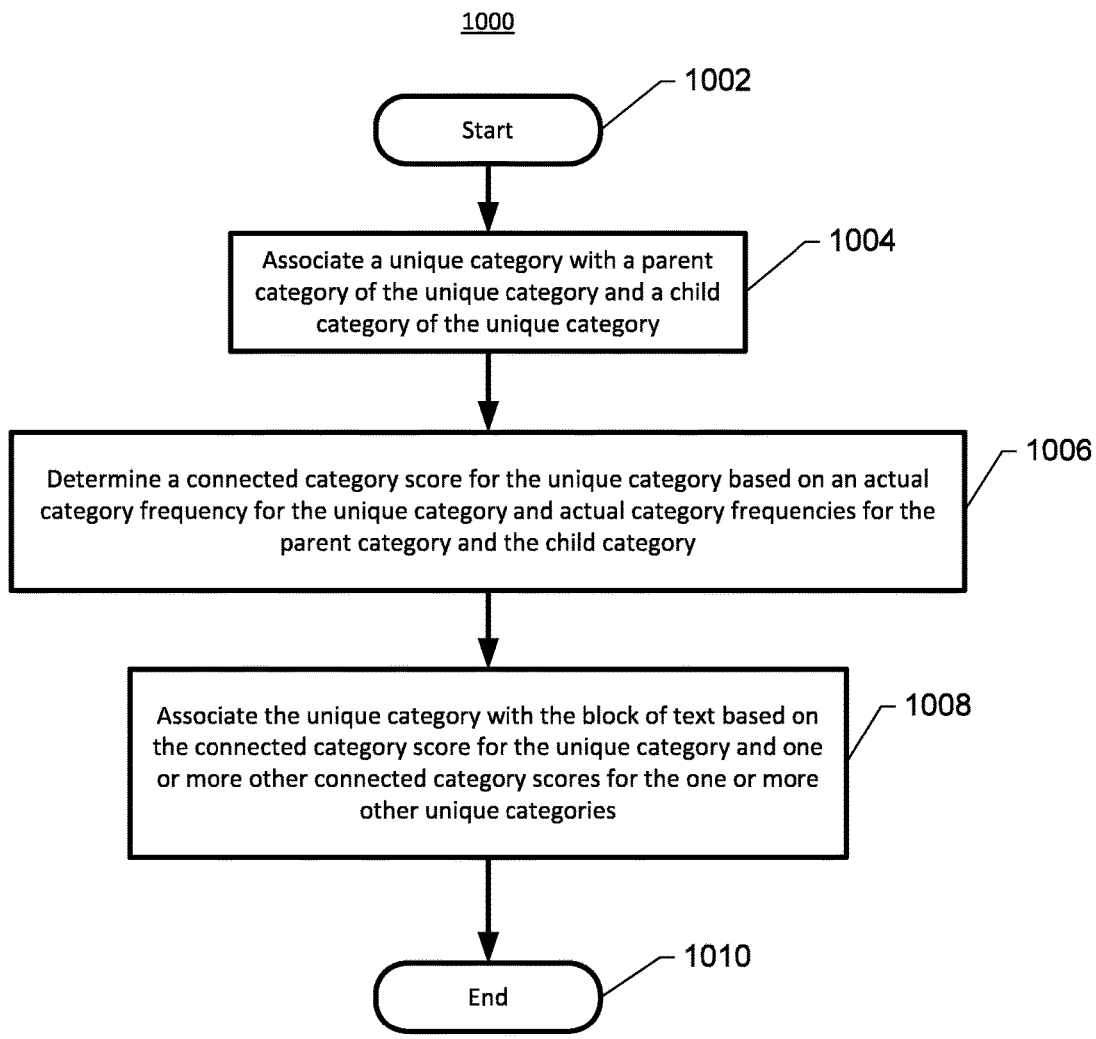
Figure 11:
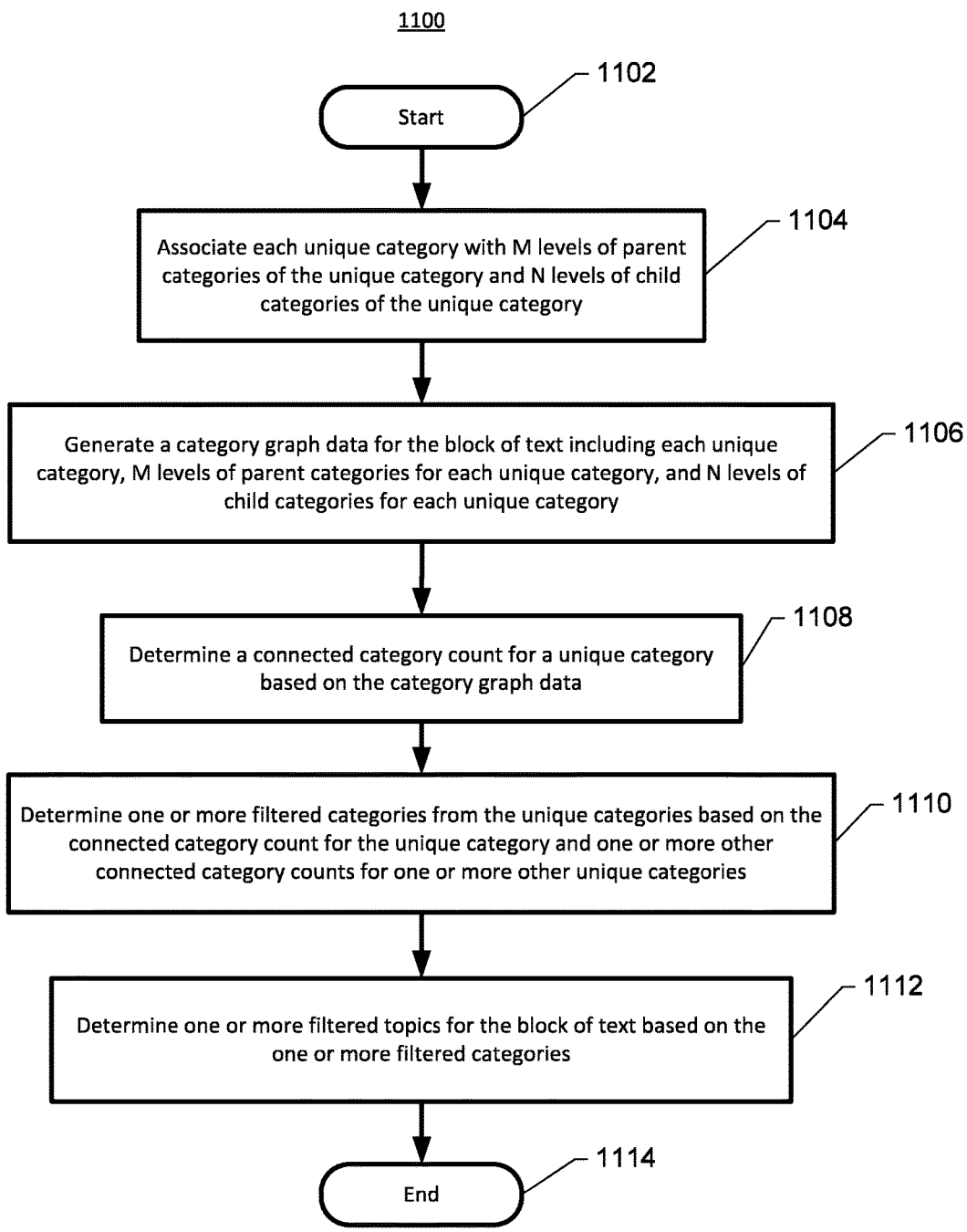

Having thus described some embodiments in general terms, reference will now be made to the accompanying drawings, which are not necessarily drawn to scale, and wherein:

FIG. 1 shows an example system in accordance with some embodiments;

FIG. 2 shows example circuitry in accordance with some embodiments;

FIG. 3 shows an example topic listing in accordance with some embodiments;

FIG. 4 shows an example topic-to-category mapping in accordance with some embodiments;

FIG. 5 shows an example hierarchal category graph in accordance with some embodiments;

FIG. 6 shows an example of a method for programmatically classifying text performed in accordance with some embodiments;

FIG. 7 shows an example of a method for associating one or more unique categories with a block of text based on category scores performed in accordance with some embodiments;

FIG. 8 shows an example of a method for associating one or more unique categories with a block of text based on topic support count performed in accordance with some embodiments;

FIG. 9 shows an example of a method for associating one or more unique categories with a block of text based on surprise scores performed in accordance with some embodiments;

FIG. 10 shows an example of a method for associating one or more unique categories with a block of text based on connected category scores performed in accordance with some embodiments; and FIG. 11 shows an example of a method for category and/or topic filtration performed in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the other device or may be received indirectly via one or more intermediary devices, such as, for example, one or more servers, relays, routers, network access points, base stations, and/or among other things, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or among other things.

As used herein, the term "method" refers to one or more steps that may be performed by a device, apparatus, system, circuitry, one or more processors, and/or among other things. Where an example method is shown as including more than one step, it will be appreciated that the steps may be performed in different orders than as shown in the example and that not all steps are necessarily required.

Brief Overview

Methods, systems, apparatus and computer program products described herein are operable for programmatically classifying text. Some embodiments may provide for a system configured to programmatically classify text, such as one or more blocks of text, by associating the text with one or more categories. Advantageously, the text may be classified with high accuracy using some or all of the techniques disclosed herein even when little or nothing is known about the subject matter of the text prior to classification.

In some embodiments, text may be classified based on topics and categories. For example, a text may be classified by being associated with one or more categories based on the topics identified in the text. A "topic," as used herein, may refer to a key word or phrase that may be extracted (e.g., identified) from a text by programmatically analyzing the text. A topic may indicate a narrow subject of the text. For example, "Java" or "Visual Basic" may be example topics identified from a text more broadly directed to programming language. In another example, "Santa Clara" may be an example topic identified from a text more broadly directed to cities.

A "category," as used herein, may refer to the broader subject matter and/or concepts of the text by which the text may be classified. For example, the programming language category may be associated with a text based on the Java or Visual Basic topics being identified in the text. In another example, the city category may be associated with a text based on the Santa Clara topic being identified in the text. To draw an explanatory analogy in the context of a textbook, a category may refer to the broader theme(s) and/or subject(s) of the textbook, such as may be analogous to the chapters and/or sections listed in a table of contents. In contrast, a topic may be the narrower subjects of the textbook, such as may be analogous to the items listed in the index. In some embodiments, a topic may be the same as a category when appropriate and/or specified by the classification data. For example, "city" may also be a topic associated with a broader geography category.

Some embodiments may provide for associating at least one category with a text to programmatically classify the text. For example, based on an analysis of the topics identified from a block of text, unique categories associated with the topics may be further determined. The unique categories can be scored and/or ranked based on a variety of techniques disclosed herein. In some examples, the categories may be scored and/or ranked based on a comparison of the relative frequency of topics and/or associated categories are found in the text. Alternatively and/or additionally, the categories may be scored and/or ranked based on a comparison of the frequency of each topic and/or category of the block of text relative to an "average" block of text (e.g., of the same length).

As discussed in greater detail, herein, for example, categories may be scored and/or ranked based on topic frequencies, category frequencies, category scores, topic support count, surprise scores, connected category scores, and/or combinations thereof. Some embodiments may further provide for techniques for category and/or topic filtration. For example, topics and/or categories that are more closely related to other topics and/or categories for the block of text may be extracted and topics and/or categories that are less closely related to other topics and/or categories may be filtered out or otherwise removed from consideration.

In some embodiments, a text or a block of text may be programmatically classified by being associated with one or more categories. For example, consumer data indicating a consumer's purchases, preferences, browsing history, and/or among other things can be used to provide text recommendations to the consumer based on comparing topics and/or categories of consumer interest with the topics and/or categories programmatically associated with texts.

Exemplary System Architecture

FIG. 1 shows an example system 100, in accordance with some embodiments. System 100 may include commercial system 102, network 104, and user device 106. Commercial system 102 may be communicably connected with user device 102 via network 104. Commercial system 102 may include commercial server 108, commercial database 110, classification server 118, and classification database 120. Commercial server 108 may include circuitry, networked processors, and/or among other things configured to perform some or all of the server-based processes described herein related to providing products and/or services to users and may be any suitable network server and/or other type of processing device. In some embodiments, commercial system 102 may function as a "cloud" with respect to the user device 106. In that sense, commercial server 108 may include several servers performing interconnected and/or distributed functions. To avoid unnecessarily overcomplicating the disclosure, commercial server 108 is shown and described herein as a single server.

Commercial database 110 may be any suitable network storage device configured to store some or all of the information described herein. As such, commercial database 110 may include, for example, one or more database systems, backend data servers, network databases, cloud storage devices, etc. To avoid unnecessarily overcomplicating the disclosure, commercial database 110 is shown and described herein as a single database.

In some embodiments, commercial database 110 may be configured to store data represented by digital locker 114 and content 116. Digital locker 114 be associated with a user (e.g., via a user account provided by commercial system 102) and may include content reference data with associations, indicia of rights, and/or links to content 116 purchased (or otherwise legally acquired, owned, licensed, etc.) by the user. In that sense, digital locker 114 may serve as a remote repository associated with the user's account that can be accessed by some or all of the devices of the user. Furthermore, each user and/or account may be associated with a digital locker 114 such that commercial database 110 may include a plurality of digital lockers.

Content 116 may include any type of content in any suitable format. Some examples of content may include texts, electronic books, newspapers, magazines, music, television shows, movies, application programs and data, data files, among other things. In some embodiments, copies of content 116 may be stored in separate digital locker 114, such as in one or more different databases. In that sense, commercial system 102 may not need to store redundant copies of the same content for each user having ownership rights to the content. In some embodiments, content including text may be additionally or alternatively be stored in classification database 120 for the purposes of programmatically classifying the content.

In some embodiments, classification server 118 may be configured to perform some or all of the techniques discussed herein with respect to programmatically classifying text. In some embodiments, classification server 118 may be configured to receive a text as an input. For example, the text may be content such as a data file, electronic book, newspaper, magazine, article, webpage, among other things, or some portion thereof. Classification server 118 may be configured to process the input text and to output one or more categories determined to be associated (e.g., related) with the input text. For example, the output may be sent to commercial server 108. Commercial server 108 may be further configured to provide recommendations of the text based on the output.

The categories determined by classification server 118 may provide a content-based recommendation that does not necessarily require a significant volume of co-purchase sales data. For example, a book that is highly relevant to a user that enjoys science fiction involving aliens (e.g., as determined by tracking the users purchases, product searches and page visits, interests, user profile, commercial activity, etc.) may be recommended to the user based on the book being determined to be associated with "science fiction" and "aliens" categories even though the book is rarely purchased, recently released, or otherwise lacking associated sales data.

Classification database 120 may be configured to store classification data that may be used, such as by classification server 118, to classify text. The classification data may provide one or more text classification systems based on which text may be classified by content. In some embodiments, the classification data may include topic listing 122, topic-to-category mapping 124, and hierarchal category graph 126. Topic listing 122 may indicate topics that may be identified from text, and is discussed in further detail below with respect to FIG. 3. Topic-to-category mapping 124 may indicate associations of topics and categories, and is discussed in further detail below with respect to FIG. 4.

Hierarchal category graph 126 may include a mapping of relationships between categories, and is discussed in further detail below with respect to FIG. 5. In some embodiments, a unique set of categories and associated topics of a text classification system may be defined by topic listing 122, topic-to-category mapping 124, and hierarchal category graph 126.

In some embodiments, one or more processors and/or other circuitry may be configured to perform the functionality discussed herein with respect to classification server 118 and/or classification database 120. For example, circuitry may be configured to programmatically classify text based on classification data stored in a memory.

Network 104 may include one or more wired and/or wireless communication networks including, for example, a wired or wireless local area network (LAN), personal area network (PAN), metropolitan area network (MAN), wide area network (WAN), among other things, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

User device 106 may be associated with a user, such as a consumer with an account provided by commercial system 106. User device 106 may be configured to present content (e.g., content 116), facilitate electronic communications (e.g., with other user devices 106, commercial system 102, etc.), perform computing functionality, and/or among other things. Although a single user device 106 is shown, system 100 may include any number of user devices that may be associated with various other users. User device 106 may be a mobile device and/or a stationary device. For example, user device 106 may be a mobile device such as a cellular telephone (including smartphones and/or other types of mobile telephones), laptop, tablet, electronic reader, e-book device, media device, and/or among other things. Additionally and/or alternatively, user device 106 may be a stationary device such as a desktop computer, work station, point-of-sale device, and/or among other things.

A user may access content 116 and/or digital locker 114 with user device 106, such as via a browser-based and/or non-browser-based (e.g., application-based) interface. In some embodiments, user device 106 may be configured to store user account data, such as login data or other account credential. User device 106 may be further configured to download copies of content 116, such as by accessing or otherwise interacting with digital locker 114. After content 116 is downloaded to user device 106, the user may engage with content 116 locally on user device 106 (e.g., read a book, listen to music or watch a video). Additionally and/or alternatively, one or more files including content 116 may be kept within commercial system 102 and streamed to user device 106.

FIG. 2 shows a schematic block diagram of example circuitry 200, some or all of which may be included in commercial system 102, commercial server 108, commercial database 110, classification system 118, classification database 120, and/or user device 106. In accordance with some example embodiments, circuitry 200 may include various means, such as one or more processors 202, memories 204, input/output modules 208, and/or communications modules 210.

In some embodiments, such as when circuitry 200 is included in classification system 118 or commercial server 108, text classification module 212 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or among other things), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA, among other things, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, among other things for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

In some embodiments, such as where circuitry 200 is included in user device 106, memory 204 may be configured to store content (e.g., eBooks, music and video files), application data (e.g., software for implementing functions on user device 106), firmware, user preference information (e.g., content preferences), authentication information (e.g., access data associated with authorized users), transaction information (e.g., financial data such as credit card information, purchase history, browsing history, etc.), wireless connection information (e.g., access and/or authentication data for establishing a wireless connection), subscription information (e.g., information that tracks podcasts, television shows, or other the like), contact information (e.g., telephone numbers, email addresses, etc.) calendar and scheduling information, any other types of data, and/or any combinations thereof.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or among other things. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, text classification module 210 may also or instead be included and configured to perform the functionality discussed herein related to programmatically classifying text. In some embodiments, some or all of the functionality of text classification module 210 may be performed by processor 202. In this regard, the example processes and algorithms discussed herein can be performed by at least one processor 202 and/or text classification module 210. For example, non-transitory computer readable storage media can be configured to store firmware, one or more application programs, and/or other software, which include instructions and other computer-readable program code portions that can be executed to control processors of the components of system 200 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Topics and Categories

Some embodiments may provide for techniques for classifying text based on topics and categories. The topics, categories, and their relationships to each other may define a text classification system. In some embodiments, the topics, categories, and their relationships in the text classification system may be defined by classification data, such as the classification data stored in classification database 120 as shown in FIG. 1.

FIG. 3 shows an example topic listing 300, in accordance with some embodiments. Topic listing 300 may include classification data stored in system 102, such as within classification database 120. Topic listing 300 may define each topic that may be identified from input text. In that sense, topic listing 300 may include a "dictionary" of topics that may be applied to any text without requiring predetermination of the subject matter or content of the text, such as by manual inspection. FIG. 3 shows only a partial listing of topics that may be found in a topic listing. Here, only example topics are shown to avoid unnecessarily overcomplicating the discussion. In some embodiments, such as depending on the text classification system, a topic may be associated with more than a single category. For example, the topic "Java" may refer to the programming language or the island of Indonesia. In some embodiments, to provide a robust classification system for text of any and/or unknown subject matter, topic listing 300 may include a vast amount of topics related to multiple (e.g., all) categories.

FIG. 4 shows an example topic-to-category mapping 400, in accordance with some embodiments. Topic-to-category mapping 400 may be stored in system 102, such as within classification database 120. Topic-to-category mapping 400 may indicate one or more categories associated with each topic, such as the topics in topic listing 122. For example, the Santa Clara topic may be associated with the saint and city categories to which the topic may belong. Santa Clara may be associated with the saint category for the person Saint Clare of Assisi and the city category for the city in California. The Java category may be associated with the programming language category and the island category for the programming language and the island of Indonesia. FIG. 4 shows only example categories that may be associated with various topics and the topics may be associated with additional categories and/or different categories than those shown in FIG. 4.

As discussed in greater detail below, some embodiments may provide for techniques for determining that a text identified as including the topic "Java" is contextually directed to the programming language category rather than the island category, or vice versa. For example, a greater frequency of topics identified in a text associated with a particular category may be used to determine that the text is directed to the particular category for the purpose of classifying the text. Similarly, a low frequency of topics identified in a text associated with a particular category may be used to indicate that the text is not directed to that particular category or to some other category.

FIG. 5 shows an example hierarchal category graph 500, in accordance with some embodiments. Hierarchal category graph 500 may be stored in system 102, such as within classification database 120. Hierarchal category graph 500 may include classification data indicating hierarchal relationships between categories, such as the categories found in topic-to-category mapping 400. For example, each unique category within topic-to-category mapping 400 may be represented as a node within hierarchal category graph 500. Furthermore, the nodes may be interconnected based on a hierarchal structure of the categories. For example, geography category 502 may be a parent of geographic location category 504, and accordingly, geographic location category 504 may be a child of geography category 502.

The parent-child relationship between categories may be configured such that a topic related to a narrower child category is also related to the broader parent category. For example, the Santa Clara topic, by virtue of being associated with the city category 508 (e.g., within topic-to-category mapping 400) may be also determined to be associated with geographic location category 504 because hierarchal category graph 500 indicates that geographic location category 504 is a parent of city category 508.

However, a topic is not necessarily associated with a child category by virtue of being associated with the child's parent category. For example, the Santa Clara topic is not necessarily associated with urban housing category 510 simply because the Santa Clara topic is associated with parent city category 508. Put another way, a user that is interested in a city could be interested in the city's news, notable residents, history, parks, landmarks, etc. and not necessarily urban housing. Here, one or more of these narrower categories of city category 508 may also be represented in hierarchal category graph 500 as children of city category 508, but are omitted from FIG. 5 to avoid unnecessarily overcomplicating the disclosure.

In some embodiments, topics may be associated with at least the narrowest applicable categories within topic-to-category mapping 400. For example, associating a text about Santa Clara with city category 508 may provide a finer and/or more useful level of classification than associating the text with only a broader parent category, such as geography category 502. In some embodiments, topics may be associated with only the narrowest applicable categories, such as shown for the topics and categories in topic-to-category mapping 400. For example, geographic location category 504 is not associated with the Santa Clara topic in topic-to-category mapping 400 because the Santa Clara topic can be associated with a narrower (e.g., child) city category 508. Furthermore, saints category 512 being neither a parent nor child (e.g., having no connection between the category nodes) of city category 508, may also be one of the narrowest applicable categories associated with the Santa Clara topic. In some embodiments, a topic may be associated with not only the narrowest categories (or category where a topic has only a single associated category), but may also be associated with parents, grandparents, children, and/or grandchildren, etc. of the narrowest categories within topic-to-category mapping 400.

Not all of the unique categories or nodes within a hierarchal category graph are necessarily interconnected. For example, computing category 506 may be neither a child nor a parent of geography category 502 in hierarchal category graph 500 because of a general lack of a subject matter relationship (e.g., via a descendant relationship from parent to child nodes) between computing and geography. Hierarchal category graph 500 shows only example categories and their hierarchal relationships, whereas robust classification for texts of virtually any subject matter may be achieved using additional categories and hierarchal relationships in accordance with the examples shown.

In some embodiments, the classification data may be generated based on electronic text classification systems. For example, some electronic encyclopedias among other things may include topics (e.g., an encyclopedia article) and associated categories and/or subcategories to which the topics belong. In some embodiments, server 118 may be configured to generate the classification data including a topic list, topic-to-category mapping, and/or hierarchal category graph by crawling or otherwise processing the electronic encyclopedia.

Programatically Classifying Text

FIG. 6 shows an example of a method 600 for programmatically classifying text, performed in accordance with some embodiments. Method 600 is described as being performed by system 102 shown in FIG. 1 (e.g., classification server 118), although one or more servers, hardware, firmware, and/or other suitably configured circuitry may also be used in various embodiments.

Method 600 may begin at 602, and proceed to 604, where server 118 may be configured to receive, from a non-transitory computer readable media, a block of text. The "block of text," as used herein, refers to a portion of electronic text to be programmatically classified. For example, the block of text may refer to a phrase, sentence, paragraph, section, chapter, or entire portion of a text. In some embodiments, the block of text may be stored in and received from the non-transitory computer readable media of classification database 120 and/or commercial database 110 (e.g., as content 116).

In some embodiments, method 600 may be performed to separately classify each block of text of a full text. For example, the block of text may be a portion of a literary work including other blocks of texts. In some embodiments, the classification results of two or more blocks of text may be merged to generate classification results (e.g., associated categories) for the entire text, such as an entire section, chapter or complete text.

At 606, server 118 may be configured to identify topics associated with the block of text. In some embodiments, server 118 may be configured to identify a topic by comparing a portion of the block of text with a topic listing of topics and determining that the portion of the block of text matches at least the topic. For example, server 118 may be configured to access the classification data stored in classification database 122, such topic listing 122 (or topic listing 300). Each topic that appears in the block of text may be identified, flagged, tracked and/or stored. Furthermore, server 118 may be configured to determine a topic count for each topic indicating the number of times that each topic appeared in the block of text.

The following is an example block of text 1 which is short for illustrative purposes, although the techniques discussed herein for programmatically classifying text may be particularly advantageous when applied to larger blocks of text:

Block of Text 1: Java was invented in Santa Clara, unlike Visual Basic and C++. Today, most computer games are written in Java.

Here, based only on the topics shown in topic listing 300 (e.g., not considering "invented," "written," "most," or other words not shown in topic listing 300), the topics Java, Santa Clara, Visual Basic, C++, and computer games may be identified from block of text 1. Furthermore, Java may be determined to have a topic count of 2, indicating that Java appeared two times within block of text 1. The other identified topics may have a topic count of 1, indicating that these topics each appeared one time.

In some embodiments, to identify the topics associated with the block of text, server 118 may be configured to generate a trie (e.g., an efficient tree structure for operations like finding prefix matches) based on the topics stored in topic listing 122. Server 118 may be further configured to use the generated trie to greedily match (e.g., left to right) the longest sequence of terms (e.g., word or phrase) in the block of text which matches a topic, flag the topic as being identified, and advance to the next word in the text after the identified sequence of terms (e.g., word or phrase). If no topic matches are found for the next word, server 118 may be configured to advance to the next word. This technique may be repeated until the entire block of text has been processed. In some embodiments, server 118 may alternatively and/or additionally be configured to use any other suitable technique for identifying topics and topic frequencies within the block of text, such as a probabilistic matching approach based on parse trees.

In some embodiments, server 118 may be configured to identify topics associated with the block of text by associating topic aliases of a topic identified within the block of text with the topic. Here, a topic alias of a topic when found in the block of text may be also identified as the topic, such as by increasing the topic count for that topic. For example, proper nouns such as "Abraham Lincoln" within the block of text may be identified with the topic "Abraham Lincoln," in accordance with the discussion above. However, the person Abraham Lincoln can be referred to in text in other ways such as "Lincoln," "Abraham," "Honest Abe," or "Uncle Abe," all of which when identified in the block of text may be associated with the topic "Abraham Lincoln." In some embodiments, associations between topics and topic aliases may be stored in classification database 120, such as within topic listing 122 or as separate but related classification data.

In some embodiments, server 118 may be configured to process the block of text to facilitate topic identification. For example, the text of the block of text may be normalized to lower case (or uppercase) and/or the punctuation marks may be removed (e.g., replaced with spaces). The normalization may be performed to place the block of text in better condition for programmatically classifying the text. In some embodiments, server 118 may be further configured to filter out stop words and/or other common words from the block of text that likely do not contribute to and/or may skew the algorithmic classification of the subject matter and/or content of the block of text (e.g. words such as "the," "at," among other things).

In some embodiments, server 118 may be configured to generate a ranking of topics for the block of text. For example, the topics may be ranked based on the topic frequency. Here, each occurrence of the topic (or topic alias) may be considered as a "vote" for that topic (and as discussed below, also the categories associated with that topic) being more important to (e.g., more likely the subject matter of) the block of text. Additionally and/or alternatively, the identified topics may be ranked and/or filtered in other ways, such as by weighing the topic frequency based on the global importance of the associated topic and/or statistical co-occurrence relationships between the topics. In another example, server 118 may be further configured to determine one or more of the highest ranking topics based on topic count for further analysis. Here, lower ranking topics based on topic count may be removed from further consideration.

At 608, server 118 may be configured to identify one or more categories for each of the topics. For example, server 110 may be configured to associate each of the topics (e.g., as identified from the block of text and/or subsequent to topic filtration and/or extraction) with one or more categories. For example, the identification of categories based on topics may be based on the classification data of topic-to-category mapping 124 (or topic-to-category mapping 400), such as may be received from classification database 120. With reference to block of text 1, for example, the Java topic may be associated with the programming language and island categories, as determined by referencing topic-to-category mapping 400. As such, server 110 may be configured to identify the programming language and island categories based on the Java topic being identified from the block of text. In some embodiments, server 118 may be configured to identify one or more categories for each of the topics by generating the classification data, such as the associations between topics and categories, in any suitable format.

At 610, server 118 may be configured to determine unique categories across the one or more categories for each of the topics (e.g., as identified from the block of text). "Unique categories," as used herein, refers to distinct categories, which are subset of the possible categories, which have been determined based on the topics identified to be in a particular block of text. In this regards, the unique categories may act as a type of textual fingerprint or other type of identifier of the block of text, because each distinct block of text may have a (relatively) distinct set of categories, namely unique categories, associated therewith. With reference to block of text 1 and topic-to-category mapping 400, for example, the unique categories across the associated categories for each identified topic in block of text 1 may be determined as: the programming language category (e.g., for the Java, Visual Basic, and C++ topics), the city category (e.g., for the Santa Clara topic), the saint category (e.g., for the Santa Clara topic), the island category (e.g., for the java topic), and the software category (e.g., for the computer games topic).

At 612, server 118 may be configured to determine an actual category frequency for a unique category based on a number of times each of the topics in the block of text is associated with the unique category. With reference to block of text 1 and topic-to-category mapping 400, for example, the programming language category may be determined to have an actual category frequency count of 4, with the Java topic being identified two times (e.g., with a topic count of 2) and the Visual Basic and C++ topics being each identified one time (e.g., with a topic count of 1) in block of text 1. Server 118 may be further configured to determine an actual category frequency based on all, or a subset of all (e.g., by considering only the top X number of topics, where X is a positive integer, based on the topic count and/or by using topic extraction techniques described below in connection with FIG. 9), the unique categories determined from the one or more categories for the topics identified in the block of text. For example and with reference to block of text 1 and topic-to-category mapping 400, the island category may be determined to have an actual category frequency count of 2, with the Java topic being identified two times. The city and saint categories may each be determined to have an actual category frequency count of 1, with the Santa Clara topic being identified one time. Furthermore, the software category may be determined to have an actual category frequency count of 1, with the computer games topic being identified one time.

At 614, server 118 may be configured to associate the unique category with the block of text based a comparison of the actual category frequency for the unique category and one or more other actual category frequencies for one or more other unique categories. The association of one or more unique categories with the block of text may provide a machine-generated summary of the block of text's content's meaning. Here, the block of text may be programmatically classified as belonging to the unique category based on the association of the unique category with the block of text. In some embodiments, server 118 may be configured to associate the unique category with the block of text based on the actual category frequency for the unique category being greater than the other actual category frequencies for other unique categories. With reference to block of text 1 and topic-to-category mapping 400, for example, block of text 1 may be associated with the programming language category based on the programming language category having the highest actual category frequency (e.g., 4) than the other unique categories. Method 600 may then end at 616.

FIG. 7 shows an example of a method 700 for associating one or more unique categories with a block of text based on category scores, performed in accordance with some embodiments. The category score may be determined for a unique category based on parent-child relationships between categories in a classification system. For example, the parent-child relationships may be defined by classification data such as hierarchal category graph 126 (or hierarchal category graph 500). Method 700 is described as being performed by system 102 shown in FIG. 1 (e.g., classification server 118), although one or more servers, hardware, firmware, and/or other suitably configured circuitry may also be used in various embodiments. In some embodiments, method 700 may be performed at 614 of method 600, such as after unique categories and their actual category frequencies are determined for a block of text.

Method 700 may begin at 702 and proceed to 704, where server 118 may be configured to associate a unique category with a parent category of the unique category. With reference to block of text 1 and topic-to-category mapping 400, as discussed above, the Java topic may be associated with the unique programming language and island categories as shown in topic-to-category mapping 400. With further reference to hierarchal category graph 500, the unique categories may be further associated with one or more parent categories. For example, programming language category 514 may be associated with parent software category 516 based on software category 516 being a parent of programming language category 514. Similarly, island category 518 may be associated with parent geographic location category 504 based on the parent-child relationships between unique categories defined by hierarchal category graph 500.

In some embodiments, server 118 may be configured to associate each unique category of the block of text (e.g., as determined in method 700 based on the identified topics in the block of text) with each of its parent categories. Some unique category may be associated with multiple parent categories in a hierarchal category graph. For example, a "flower" category may include parent categories of "plant parts" and "plant reproduction."

At 706, server 118 may be configured to determine an actual parent category frequency for the parent category of the unique category. The actual parent category frequency may be determined based on a number of times each of the topics in the block of text is associated with the unique parent category. With reference to block of text 1, topic-to-category mapping 400, and hierarchal category graph 500, for example, parent software category 516 of programming language category 514 may be determined to have an actual parent category frequency of 1 based on the computer games topic being identified in block of text 1. In another example, parent geographic location category 504 of island category 517 may be determined to have a parent category frequency of 0 based on there being no topic identified in block of text 1 associated with geographic location category 504 (e.g., as defined in topic-to-category mapping 400).

At 708, server 118 may be configured to determine a category score for the unique category derived from an algorithmic relationship of the actual parent category frequency and the actual category frequency. The category score may be configured to provide ranking criteria for the unique category. The category score may be determined based on an algorithmic relationship of the actual category frequency, one or more parent category frequencies, and/or one or more other ancestral category frequencies (e.g., of grandparent categories, great grandparent categories, etc.) of the unique category. In some embodiments, server 118 may be configured to determine a category for each unique category determined from the block of text. The category scores may then be compared to associate the block of text with the one or more best matching unique categories as determined by the category scores.

In some embodiments, the category score S(C) for a unique category C may be defined by Equation 1:

$$S(C) = S(C) = \sum_{i=-N/2}^{N} \frac{\log(freq(i))}{2^i}, \text{ for all } freq(i) > 0,$$

where i is an index indicating the category level of the unique category C (e.g., i=0 is the unique category, i=1 is the parent of the unique category, i=2 is the grandparent of unique category, etc.), freq(i) is the actual category frequency of the category identified by category level i (e.g., freq(i=0) is the actual category frequency, freq(i=1) is the actual parent category frequency, and freq(i=2) is the actual grandparent frequency, etc.), and N is the category level used for determining the category score.

Method 700 is shown in FIG. 7 such that the parent categories and not "ancestral" categories (e.g., grandparent or higher), are considered. Here, category level N may be set to 1 in Equation 1 such that only actual category frequencies of unique categories and their parents (e.g., as determined at 706) are considered in the category score for each unique category.

Where at least one higher level of ancestral category is to be considered in the category score (e.g., where N is greater than 1 in Equation 1), server 110 may be further configured to associate the unique category with the ancestral category, determine an actual ancestral category frequency (e.g., freq(i=2) for a grandparent category) for the ancestral category of the unique category, and determine the category score based for the unique category derived from an algorithmic relationship (e.g., Equation 1) of the actual parent category frequency, the actual ancestral category frequency, and the actual category frequency.

With reference to block of text 1, for example, the unique programming language category may be determined to have an actual category frequency of 4 (e.g., freq(i=0)=4) and an actual parent category frequency of 1 (e.g., freq(i=1)=1, for the computer games topic)). As such, the programming language category may be determined to have a category score S(C=programming language) of 602. In another example, unique island category may be determined to have an actual category frequency of 2 (e.g., freq(i=0)=2) and an actual parent frequency of 0 (e.g., because there are no topics associated with parent geographic location category 504 identified within block of text 1). Here, island category may be determined to have a category score S(C=island) of 0.301. Similarly, server 118 may be configured to determine the category score for each of the other unique categories of block of text 1, such as by applying the algorithmic relationship defined by Equation 1.

In some embodiments, more complex weighting schemes for the topics and/or categories may be used. For example, the nodes of the hierarchal category graph may be assigned different weights based on category importance and/or category weighting. For example, a PageRank or other numerical weight may be assigned to a category based on the number of parent and/or child categories linked with the category in the hierarchal category graph. In another example, server 118 may be configured to use a term frequency-inverse document frequency (tf-idf) or other numerical statistic that reflects the importance of the category and/or associated topic(s) to the block of text. For example, a tf-idf may be used to provide weighting factors for unique categories and/or their actual category frequency based on the number of times the category (and/or associated topics) may be expected to occur (e.g., in an "average" block of text) to control for the fact that some words are generally more common than others.

At 710, server 118 may be configured to associate the unique category with the block of text based on the category score for the unique category and one or more other category scores for the one or more other unique categories. The discussion above at 614 of method 600 may be applicable at 710. Alternative to and/or in addition to the association of categories and the block of text being based on the actual category frequencies for the unique categories (e.g., at 614), server 118 may be configured to associate the categories with the block of text based on the category scores for the unique categories. With reference to block of text 1, for example, block of text 1 may be associated with the programming language category based on the programming language category having a higher category score than the other unique categories. Here, however, the computer games topic identified in block of text 1 also contributes to the category score for the programming language category, further indicating that block of text 1 can be classified as being related to programming language (e.g., rather than islands).

In some embodiments, the actual category frequencies may be normalized based on the length of the block of text. In general, the number of times a topic is identified from a block of text may depend on the length of the block of text. As such, the actual category frequencies (e.g., freq(i)) in category score S(C) may be further weighted based on the length of the block of text. In some embodiments, the normalization may be skipped, such as when only the relative ordering of the categories of the block of text are needed. Method 700 may then end at 712.

FIG. 8 shows an example of a method 800 for associating one or more unique categories with a block of text based on topic support count, performed in accordance with some embodiments. Method 800 is described as being performed by system 102 shown in FIG. 1 (e.g., classification server 118), although one or more servers, hardware, firmware, and/or other suitably configured circuitry may also be used in various embodiments. In some embodiments, method 800 may be performed at 614 of method 600, such as after unique categories and their actual category frequencies are determined for a block of text.

Method 800 may begin at 802 and proceed to 804, where server 118 may be configured to determine a topic support count for a unique category. A "topic support count" for a unique category, as used herein, refers to the number unique topics identified from the block of text that are associated with the unique category. For example, the associations between topics and categories may be defined by classification data, such as topic-to-category mapping 124 and/or 400.

With reference to block of text 1, for example, the programming language category may be determined to have a topic support count of 3 because the unique Java, Visual Basic, and C++ topics identified from block of text 1 are each associated with the programming language category (e.g., as shown in topic-to-category mapping 400 in FIG. 4). In another example, the island category may be determined to have a topic support count of 1 because only the unique Java topic identified from block of text 1 is associated with the island category. In some embodiments, server 110 may be configured to determine a topic support count for each unique category determined from the block of text (e.g., at 610 of method 600).

At 806, server 118 may be configured to associate the unique category with the block of text based on the topic support count for the unique category and one or more other unique topic support counts for the one or more unique categories (e.g., as determined at 610 of method 600). In general, a unique category identified from a block of text that includes a greater topic support count may be more likely to be the subject matter of the block of text than another unique category that includes a smaller topic support count. For example, a block of text where the Java topic appears 10 times may result in both the programming language and the island categories being determined to have an actual category frequency (e.g., before any normalization for the length of the block of text) 10. The fact that the Java topic appeared 10 times, however, does not in itself help determine whether the Java topic is being used in the context of the programming language or island categories. However, if the block of text also includes other unique topics that are associated with the programming language category and not the island category, this information can be used to deduce that the block of text is more likely to be directed to the programming language category rather than the island category. As discussed above with respect to block of text 1, for example, the programming language category having a topic support count of 4 may be associated with the block of text rather than the island category having a topic support count of 1.

Methods 600 and 700, as described so far, may be performed to classify a block of text based on comparisons of actual category frequencies across unique categories identified in the block of text. Method 800 may be performed to classify a block of text based on topic support counts for unique categories identified in the block of text. In general, the unique categories may be ranked, such as based on actual category frequencies, category scores, topic support counts, and/or combinations thereof, and one or more of the highest ranking categories may be selected for association with the block of text. Some embodiments may provide for techniques for associating a category set including one or more unique categories with the block of text. For example, associating only the highest ranking category may be under-inclusive for failing to represent a full and/or accurate account of the subject matter of the block of text. Conversely, when an over-inclusive set of unique categories are associated with the block of text, some of those categories may inaccurately represent the subject matter of the block of text. A category set, as used herein, refers to a set of one or more categories that may be associated with a block of text for classification that is neither under-inclusive nor over-inclusive.

FIG. 9 shows an example of a method 900 for associating one or more unique categories with a block of text based on surprise scores, performed in accordance with some embodiments. Method 900 is described as being performed by system 102 shown in FIG. 1 (e.g., classification server 118), although one or more servers, hardware, firmware, and/or other suitably configured circuitry may also be used in various embodiments.

The surprise score for a unique category may indicate an extent to which the actual category frequency of the unique category in the block of text is an outlier relative to an expected category frequency of the unique category that may be expected within an "average" block of text substantially the same length (e.g., the same or substantially the same data volume, number of characters, number of words, and/or among other things). For example, a block of text where the programming language category associated with identified topics identified more than would be expected in an average block of text of the same length may indicate that the block of text is more likely to be directed to programming language. Conversely, a block of text where the island category is less associated with identified topics than would be expected in an average block of text of the same length may indicate the block of text is less likely to be directed to islands. Here, actual category frequencies may be normalized to the length of the block of text to handle input blocks of text of varying length. In some embodiments, the unique categories may be ranked by surprise score and one or more of the highest scoring categories by surprise score may be associated with the block of text. In some embodiments, the surprise scores may be each compared with a surprise score threshold. One or more unique categories with surprise scores that exceed the surprise score threshold may be associated with the block of text. Here, the one or more unique categories that exceed the surprise score threshold may represent a category set that is neither over-inclusive nor under-inclusive with respect to the classification of the block of text.

In some embodiments, method 900 may be performed at 614 of method 600, such as after unique categories and their actual category frequencies are determined for a block of text. Method 900 may begin at 902 and proceed to 904, where server 118 may be configured to determine an expected category frequency for a unique category. As discussed above, the expected category frequency may indicate a rate that the unique category that may be expected within an "average" block of text substantially the same length (e.g., the same or substantially the same data volume, number of characters, number of words, and/or among other things). In some embodiments, server 118 may be configured to determine an expected category frequency for more than one (e.g., each) unique category determined from the block of text (e.g., as determined at 610 of method 600).

In some embodiments, server 118 may be configured to generate expected category frequency data indicating an expected category for each category within the text classification system defined by the classification data. For example, the expected category frequencies may be stored in classification database 120 (e.g., topic-to-category mapping 124, hierarchal category graph 126, and/or as separate but related data).

In some embodiments, the expected category frequency and/or expected category frequency data may be generated based on a sampling of texts. For example, the sampling may be based on a volume of texts, such as texts directed across multiple categories and/or topics. In some embodiments, server 118 may be configured to normalize the expected category frequencies based on the length of the block of text. Here, frequency rates (e.g., category frequency per word count, topic count, category count, character count, data size, etc.) may be used such that the analysis may properly handle input blocks of text of differing length. In some embodiments, the expected category frequency and/or expected category frequency data may be generated using a technique similar to method 600. For example, actual category frequencies may be determined and/or normalized for a sampled text as one or more input blocks of text in method 600.

Additionally and/or alternatively, the expected category frequency for a unique category may be determined based on the number of topics associated with the unique category, such as may be defined by the classification data of topic-to-category mapping 124. In general, a category associated with a larger number of topics in the classification data may be expected to be determined from a block of text (e.g., at 610 of method 600) more frequently than a category associated with a smaller number of topics. As such, server 118 may be configured to determine the expected category score based on the number of topics associated with the unique category.

At 906, server 118 may be configured to normalize the actual category frequency for the unique category based on the length of the block of text. For example, the actual category frequency may be normalized for comparison with the expected category frequency. Here, the actual category frequency may also be a frequency rate, such as actual category frequency per word count, topic count, category count, character count, data size, etc. for the block of text. Server 118 may be further configured to determine the length of the block of text. In some embodiments, server 118 may be further configured to normalize each actual category frequency for each of the unique categories (e.g., as determined at 610 of method 600) based on the length of the block of text.

At 908, server 118 may be configured to determine a surprise score for the unique category derived from an algorithmic relationship of the actual category frequency and the expected category frequency. As discussed above, the surprise score for the unique category may indicate an extent to which the actual category frequency of the unique category in the block of text is an outlier relative to the expected category frequency of the unique category.

In some embodiments, the surprise score may be a standard score or Z-score indicating a (signed) number of standard deviations the actual category frequency is different from the expected category frequency. For example, in some embodiments, the surprise score SS(C) for a unique category C may be defined by Equation 2:

$$SS(C) = \frac{\text{Actual category frequency} - \text{Expected category frequency}}{\sigma},$$

where σ is the standard deviation of the sampled category frequencies from the expected category frequency. Here, the surprise score may be 0 when the actual category frequency is the same as the expected category frequency, positive when the actual category frequency is greater than the expected category frequency, and negative when the actual category frequency is less than the expected category frequency.

At 910, server 118 may be configured to associate the unique category with the block of text based on the surprise score for the unique category. In some embodiments, server 118 may be configured to determine a surprise score threshold and associate each unique category (e.g., as determined at 610 of method 600) with the block of text when the surprise score for the unique category exceeds the category score threshold. For example, the surprise score threshold may be 0 such that the block of text is associated with categories having actual category frequencies greater than the expected category frequencies. In another example, the surprise score may be a positive value greater than 0, such that the block of text is associated with categories having actual category frequencies that exceed expected category frequencies by a threshold amount.

In some embodiments, server 118 may be configured to associate the unique category with the block of text based on the surprise score for the unique category and one or more other surprise scores for the one or more other unique categories. For example, the surprise scores for the unique categories may be determined and the unique categories may be ranked based on the surprise scores. Server 118 may be further configured to associate one or more of the highest ranking unique categories based on surprise score with the block of text. In some embodiments, server 118 may be further configured to associate one or more of the highest ranking unique categories that additionally exceed a surprise score threshold with the block of text. Method 900 may then end at 912.

FIG. 10 shows an example of a method 1000 for associating one or more unique categories with a block of text based on connected category scores, performed in accordance with some embodiments. Method 1000 is described as being performed by system 102 shown in FIG. 1 (e.g., classification server 118), although one or more servers, hardware, firmware, and/or other suitably configured circuitry may also be used in various embodiments.

The connected category score for a unique category may indicate an extent to which the block of text is directed to the unique category based on connected categories related to the unique category (e.g., as defined by the classification data, such as a hierarchal category graph). A "connected category," as used herein, may refer to the ancestors (e.g., parents, children, grandparents, grandchildren, etc.) of a unique category and/or related categories that are not direct ancestors. With reference to hierarchal category graph 500, for example, island category 518 may be a connected category of city category 508 despite being neither a direct parent nor child of city category 508. Here, island category 518 and city category 508 are connected via parent geographic location category 504. In contrast, software category 516 may not be a connected category for city category 508 because the two categories are not connected.

Method 1000 may begin at 1002 and proceed to 1004, where server 118 may be configured to associate a unique category (e.g., as determined at 610 of method 600) with a parent category of the unique category and/or a child category of the unique category. In some embodiments, server 118 may be configured to associate with unique category with M levels of parent categories and/or N levels of child categories, where M and N are positive integers. In some embodiments, one of M or N may be 0, such that only parent or child categories of the unique category are considered. In some embodiments, the parent-child relationships between unique categories may be stored as classification data within classification database 120, such as within hierarchal category graph 126.

In some examples, M and N may be both set to value of 1. Here, server 118 may be configured to associate the unique category with the parent category(s) and child category(s) of the unique category. With reference to block of text 1 and hierarchal category graph 500, for example, unique city category 508 (e.g., as determined based on the identified Santa Clara topic in block of text 1) may be associated with parent geographic location category 504 and child urban housing category 510. In another example, where M is set to a value of 2, unique city category 508 may be associated with grandparent geography category 502.

In some embodiments, server 118 may be configured to associate each unique category (e.g., as determined at 610 of method 600) with M levels of parent categories and/or N levels of child categories. For example, server 118 may be configured to generate category graph data for the block of text based on the unique categories, M levels of parent categories for each unique category, and N levels of child categories for each unique category. In some embodiments, the category graph data may define an actual category graph and may be determined based on the hierarchal category graph (e.g., hierarchal category graphs 126 and/or 500) defined by the classification data. Unlike the hierarchal category graphs, however, the actual category graph may not include parent-child relationships for each unique category of the text classification system (e.g., as defined by the classification data). Instead, the actual category graph may include only the parent-child relationships of the unique categories determined from the block of text and their M levels of parent categories and/or N levels of child categories. In some embodiments, each unique category of the actual category graph may represent a node of the actual category graph.

At 1006, server 118 may be configured to determine a connected category score for the unique category based on an actual category frequency for the unique category and actual category frequencies for the parent category and the child category. In some embodiments, server 118 may be further configured to determine a connected category score based on an algorithmic relationship of the actual category frequency of the unique category, an actual category frequencies for each parent category of the M levels of parent categories, and/or an actual child category frequency for each child category of the N levels of child categories of the unique category.

In some embodiments, the connected category score for the unique category may be based on an algorithmic relationship of one or more of the category scores, topic support counts, surprise scores, connected category counts (e.g., as discussed in greater detail below and in connection with FIG. 11), and/or combinations (e.g., weighted combinations) thereof, of each unique category and any categories connected with the unique category (e.g., the M levels of parent categories and/or N levels of child categories) as defined by the category graph data, such as by an actual category graph.

In some embodiments, server 118 may be further configured to determine a connected category count for the unique category. The connected category count, for example, may indicate the number of unique categories that are connected with the unique category via the parent-child relationships defined by the category graph data, such as within the actual category graph. With reference to block of text 1 and hierarchal category graph 500, for example, unique city category 508 may be determined to have a connected category count of 4 (e.g., where M and N are 1). The first connected category may be unique city category 508. Two of the other connected categories may be parent geographic location category 504 and child urban housing category 510. Furthermore, because the Java topic associated with island category 518 (e.g., as defined by topic-to-category mapping 124) was also identified in block of text 1 and because geographic location category 504 is also a parent of island category 518 (e.g., as defined by hierarchal category graph 500), island category 518 may also be a connected category to city category 508, resulting in the connected category count of 4 for city category 508. In another example, where M is set to a value of 2, city category 508 may be further associated with grandparent geography category 502 (e.g., with a connected category count of 5). In a third example, where N is set to a value of 2, city category 508 may be further associated with grandchild urban housing category 510 (e.g., with a connected category count of 6). In some embodiments, server 118 may be further configured to determine a connected category count for each of the unique categories determined from the block of text.

In some embodiments, server 118 may be configured to determine a connected category score for each unique category determined from the block of text for comparison. For example, the connected category scores may be based on scores for each category that contributes to the connected category count for the unique category (e.g., the M levels of parent categories and/or N levels of child categories of the unique category). With reference to block of text 1 and hierarchal category graph 500, for example, the connected category score for city category 508 may be determined based on the scores for city category 508 and connected urban housing category 510, geographic location category 504 and island category 518. As such, greater sets of connected category nodes (e.g., representing categories associated with larger connected category counts) may contribute to a larger connected category score than smaller sets of connected category nodes, which may be further used to classify the block of text.

At 1008, server 118 may be configured to associate the unique category with the block of text based on the connected category score for the unique category and one or more other connected category scores for the one or more other unique categories. For example, server 118 may be further configured to rank unique categories based on the connected category scores and associate one or more of the highest ranking unique categories with the block of text. Method 1000 may then end at 1010.

Category and Topic Noise Filtration

Some embodiments may provide for techniques for filtration of relevant topics and associated categories from a block of text. The filtered categories and/or topics may include a subset of all of the categories and/or topics that may be extracted from the block of text. For example, categories and/or topics that are more related to the overall subject matter of the block of text (e.g., as determined by the classification data) may be extracted for further consideration, and conversely, topics that are less related to the overall subject matter may be filtered out. Here, topic extraction may provide for noise filtering of less relevant topics in a block of text that may otherwise contribute to undesirable noise during the programmatic classification of the block of text.

FIG. 11 shows an example of a method 1100 for category and/or topic filtration, performed in accordance with some embodiments. Method 1100 is described as being performed by system 102 shown in FIG. 1 (e.g., classification server 118), although one or more servers, hardware, firmware, and/or other suitably configured circuitry may also be used in various embodiments. In some embodiments, method 1100 may be performed with one or more of methods 600, 700, 800, 900 and/or 1000. For example, method 1100 may be performed after 610 of method 600, where one or more unique categories may be determined across the one or more categories for each of the identified topics from the block of text. After determining the filtered categories from each of the identified topics, one or more scoring techniques discussed herein for ranking and/or associating categories with the block of the text may be used. Here, however, filtered categories may be scored (e.g., using category scores, topic support counts, surprise scores, connected category scores, connected category counts, and/or combinations thereof) based on accounting for actual category frequencies of each parent and child category of the filtered categories.

In some embodiments, method 1100 may be performed first such that methods 600, 700, 800, 900 and/or 1000 may use a filtered subset of extracted topics and their associated unique categories rather than all of the topics identified in the block of text and their associated unique categories. In another example, the topic and/or category filtration of method 1100 may be performed after any of methods 600, 700, 800, 900, and/or 1000 such as to determine one or more filtered categories when multiple unique categories that may not be relevant would be otherwise determined from and/or associated with the block of text.

Method 1100 may begin at 1102 and proceed to 1104, where server 118 may be configured to associate each unique category (e.g., as determined at 610 of method 600) with a parent category of the unique category and a child category of the unique category. The discussion above at 1004 of method 1000 may be applicable at 1104. For example, server 118 may be configured to associate the unique category with M levels of parent categories and/or N levels of child categories, where M and/or N are positive integers or 0. In some embodiments, one of M or N may be 0, such that only parent or child categories of the unique category are considered.

At 1106, server 118 may be configured to generate a category graph data for the block of text. The category graph data may indicate an actual category graph generated based on each of the unique categories, M levels of parent categories for each unique category, and N levels of child categories for each unique category. For example, the actual category graph may indicate hierarchal parent-child relationships between the categories. Furthermore, the category graph data may be generated based on a text classification system defined by the classification data, such as hierarchal category graph 500. The discussion above regarding actual category graphs at 1006 of method 1000 may be applicable at 1106.

At 1108, server 118 may be configured to determine a connected category count for a unique category based on the category graph data. The discussion above regarding connected category counts at 1006 of method 1000 may be applicable at 1106. For example, the connected category count for the unique category may indicate a number of unique categories determined from the block of text that are connected with the unique category. In some embodiments, server 118 may be configured to determine a connected category count for each unique category (and/or each set of connected categories) based on the category graph data.

At 1110, server 118 may be configured to determine one or more filtered categories from the unique categories based on the connected category count for the unique category and one or more other connected category counts for one or more other unique categories. In some embodiments, server 118 may determine the one or more filtered categories from the unique categories based on the connected category count for each unique category. For example, server 118 may be configured to rank the unique categories based on the connected category count for each unique category. In general, a larger connected category count for a unique category may indicate that the block of text is more likely to be directed to the unique category. Server 118 may be further configured to determine the one or more filtered categories based on the ranking. For example, the one or more highest ranking unique categories may be determined as the one or more filtered categories.

In some embodiments, server 118 may be further configured to determine the one or more filtered categories based on factors in addition and/or alternative to the connected category count. For example, larger, more "tightly" connected categories within the actual category graph may be associated with a higher weighting value for the connected category count than smaller or more loosely connected categories. In that sense, not all connected categories may contribute the same amount to the connected category score of a unique category. In another example, connected categories which are supported by multiple topics identified from the block of text (e.g., having a larger topic support count) may receive a higher weighting value than connected categories supported by fewer topics.

In some embodiments, server 118 may be configured to determine one or more filtered categories from the unique categories based on the connected category count for each unique category by determining a connected category score for each of the unique categories and ranking the unique categories based on the connected category scores. Here, a connected category score for a unique category may be based on an algorithmic relationship of one or more of the category scores, topic support counts, surprise scores, connected category counts, and/or combinations (e.g., weighted combinations) thereof, of the unique category and any categories connected with the unique category (e.g., the M levels of parent categories and/or N levels of child categories) as defined by the category graph data. In that sense, the connected category score of a filtered category may be based on the connected category count for the filtered category in that the connected category score may be derived based on accounting for each connected category (e.g., as well as the base unique category to which the connected categories are connected) that contributes to the connected category count.

For example, where the connected category score is based on surprise scores of connected categories, the connected category score for each unique category C may be defined by Equation 4:

$$CCS(C) = \sum_{i=0}^{N} w(i) * \left( \frac{\text{Actual category frequency}(i) - \text{Expected category frequency}(i)}{\sigma(i)} \right),$$

where i is an index indicating the category level of the unique category C, σ(i) is the standard deviation of the sampled category frequencies from the expected category frequency for the ith category, N is the connected category count, and w(i) is a weighting factor that may be applied to the surprise score for the ith category. In some embodiments, such as where weighting is not used, w(i) may be 1 for all categories i. In another example, such as where weighting is used, w(i) values may vary for various categories i. For example, the surprise score for category C may be associated with a higher w(i) than a parent, child, grandparent, grandchild, etc. Additionally and/or alternatively, a parent can be associated with a higher w(i) than a grandparent and/or a child can be associated with a higher w(i) than a ground child, etc.

In some embodiments, server 110 may be further configured to rank the unique categories by their connected category scores and to determine the one or more filtered categories based on the ranking. In some embodiments, server 110 may be further configured to associate at least one of the one or more filtered categories with the block of text, such as based on their connected category count and/or connected category score.

At 1112, server 118 may be configured to determine one or more filtered topics based on the one or more filtered categories. For example, the mapping of topics and categories may be defined by classification data, such as the classification data stored in topic-to-category mapping 124 of classification database 120.

In some embodiments, the one or more filtered topics may be used as a filtered topic set for programmatically classifying the block of text, such as to provide a machine-generated summary of the block of text's content's meaning. For example, each of the one or more filtered topics may be associated with one or more categories at 608 of method 600. In another example, each of the one or more filtered categories determined at 1110 may be used as a filtered category set for which topic counts, category frequency counts, category scores, topic support counts, surprise scores and/or connected category scores may be determined using methods 700, 800, 900 and/or 1000, respectively.

In some embodiments, method 1100 may be performed after the block of text has been ranked, such as based on topic counts, category frequency counts, category scores, topic support counts, surprise scores and/or connected category scores. Server 118 may be further configured to select the top K (e.g., where K is a positive integer) scoring categories and expand the set to include M levels of the parents and N levels of the children for each of the K categories. Server 118 may be further configured to determine the connected category counts for each of the K categories and/or otherwise rank the K categories, such as based on size (e.g., connected category counts), one or more of the scores discussed herein, topic support count, among other things. Method 1100 may then end at 1114.

Conclusion

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method of programmatically classifying text, the method comprising:
   receiving a block of text that includes at least one topic;
   identifying the at least one topic by comparing each portion of a plurality of portions of the block of text to a listing of known topics;
   identifying one or more categories for each of the identified topics by referencing a topic to category map that associates the at least one topic with the one or more categories;
   identifying an expected number of times the identified one or more categories might occur in the block of text, wherein the expected number of times is based on an average block of text associated with the one or more categories and having at least one of a same data volume, a same number of characters, and a same number of words as the block of text;
   identifying a number of times the identified one or more categories occurs in the block of text;
   comparing the number of times to the expected number of times;
   responsive to determining a difference between the number of times and the expected number of times, using the difference for selecting a sub-set of at least one category from the identified one or more categories; and
   using the selected sub-set of categories for providing a machine-generated summary of a meaning of the block of text.

2. The method of claim 1, wherein the least one category selected are those that occur a higher number of times within the block of text.

3. The method of claim 1, wherein a positive value difference associated with a particular category increases a likelihood of selecting the particular category for the sub-set.

4. The method of claim 1, wherein the topic to category map comprises a listing of categories associated with topics.

5. The method of claim 1, wherein identifying the one or more categories further comprises using a hierarchal category graph comprising a map of relationships between categories in the topic to category map.

6. The method of claim 5, wherein the hierarchal category graph comprises a plurality of categories represented as a corresponding plurality of nodes in the hierarchical category graph, at least some of which are connected via a parent-child relationship.

7. The method of claim 5, wherein selecting the sub-set of at least one category is further based on a hierarchal relationship between two or more categories.

8. The method of claim 7, wherein the hierarchal relationship used to select a particular category of the sub-set is a parent-child relationship.

9. A computer program product comprising a non-transitory computer-readable medium encoding instructions that when executed by one or more processors cause a process to be carried out for programmatically classifying text, the process comprising:
   receiving a block of text that includes multiple topics;
   identifying the multiple topics by comparing portions of the block of text to a listing of known topics;
   identifying a category that is associated with a subset of the identified multiple topics by referencing a topic to category map that associates each of the topics in the subset with the category, wherein the subset includes one or more of the multiple topics included in the received block of text;
   determining an actual category frequency for the category based on a total number of times the topics in the subset occur in the block of text;
   and
   based on the determined actual category frequency, using the category for providing a machine-generated summary of a meaning of the block of text.

10. The computer program product of claim 9, wherein the category used to provide the machine-generated summary has a higher actual category frequency than an actual category frequency for a second category that is associated with a second subset of topics in the block of text.

11. The computer program product of claim 9, the process further comprising:
    identifying an expected number of times the topics in the subset might occur in the block of text; and
    comparing the actual category frequency to the expected number.

12. The computer program product of claim 11, wherein the expected number of times the topics in the subset might occur in the block of text is based on an average block of text associated with the category and having at least one of a same data volume, a same number of characters, or a same number of words as the block of text.

13. The computer program product of claim 9, wherein the topic to category map comprises a listing of multiple categories associated with the topics.

14. The computer program product of claim 13, wherein identifying the category further comprises using a hierarchal category graph comprising a map of relationships between the categories in the topic to category map.

15. The computer program product of claim 14, wherein the hierarchal category graph comprises a plurality of nodes representing the categories, at least some of the nodes being connected via a parent-child relationship.

16. The computer program product of claim 14, wherein both the category and a related category having a hierarchal relationship with the category are used for providing the machine-generated summary.

17. The computer program product of claim 16, wherein the hierarchal relationship is a parent-child relationship.

18. A system configured to programmatically classify text, the system comprising a processor configured to:
receiving a block of text that includes multiple topics;
identifying the multiple topics by comparing portions of the block of text to a listing of known topics;
identifying a plurality of categories, each of which is associated with a subset of the topics, by referencing a topic to category map that associates topics and categories;
for each of the categories, determining an expected number of times the topics in the associated subset might occur in the block of text, wherein the expected number is based on an average block of text associated with the respective category and having at least one of a same data volume, a same number of characters, or a same number of words as the block of text;
for each of the categories, determining an actual number of times the topics in the associated subset occur in the block of text;
for each of the categories, determining a difference between the actual number of times and the expected number of times;
using the difference to select a subset of at least one category from the plurality of categories; and
using the selected subset of categories for providing a machine-generated summary of a meaning of the block of text.

19. The system of claim 18, wherein the actual number of times being greater than the expected number of times for a given category increases a likelihood of selecting the given category for the subset.

20. The system of claim 18, wherein the subset of categories consists of categories having a difference above a specific threshold.

* * * * *